United States Patent [19]

Savoly et al.

[11] Patent Number: 4,674,574

[45] Date of Patent: Jun. 23, 1987

[54] FLUID LOSS AGENTS FOR OIL WELL CEMENTING COMPOSITION

[75] Inventors: Arpad Savoly, Martinsville; José L. Villa, Bridgewater, both of N.J.; Christopher M. Garvey, Wilmington, Del.; Albert L. Resnick, Edison, N.J.

[73] Assignee: Diamond Shamrock Chemicals Company, Dallas, Tex.

[21] Appl. No.: 913,132

[22] Filed: Sep. 26, 1986

[51] Int. Cl.$^4$ .................... C04B 7/35; E21B 33/138
[52] U.S. Cl. ........................ 166/293; 106/90; 106/314; 523/130
[58] Field of Search .......... 166/293, 292, 283; 523/130, 131, 132; 106/90, 314; 524/3, 4, 5, 6, 548, 555, 560; 526/287, 288

[56] References Cited

U.S. PATENT DOCUMENTS

| | | | |
|---|---|---|---|
| 4,015,991 | 4/1977 | Persinski et al. | 106/90 |
| 4,340,525 | 7/1982 | Hübner et al. | 106/90 X |
| 4,404,111 | 9/1983 | Bi et al. | 166/275 X |
| 4,480,693 | 11/1984 | Newlove et al. | 106/90 X |
| 4,555,269 | 11/1985 | Prabhakara et al. | 106/90 |
| 4,557,763 | 12/1985 | George et al. | 106/90 |
| 4,587,283 | 5/1986 | Hille et al. | 106/90 X |
| 4,602,685 | 7/1986 | McKenzie et al. | 166/293 |
| 4,626,285 | 12/1986 | Peiffer et al. | 166/293 |

*Primary Examiner*—Stephen J. Novosad

*Attorney, Agent, or Firm*—Neal T. Levin

[57] ABSTRACT

Cementing compositions and methods of using such compositions in oil, gas and water well cementing operations to reduce fluid loss from the composition to the formation are disclosed. Such compositions incorporate a terpolymer formed from (a) an acid monomer selected from the group consisting of 2-acrylamido, 2-methyl propane sulfonic acid (AMPS), sodium vinyl sulfonate or vinyl benzene sulfonate, and metal salts thereof at about 10 to 75 weight percent in the polymer; (b) an unsaturated polybasic acid such as itaconic acid at about 1 to 60 weight percent; and metal salts thereof and (c) a nonionic monomer selected from the group consisting of acrylamide, N, N dimethylacrylamide, N-vinyl pyrrolidone, N-vinyl acetamide, or dimethylamino ethyl methacrylate and metal salts thereof at about 10 to 76 weight percent. The terpolymer should have a molecular weight between 200,000 to 1,000,000. The preferred terpolymer comprise AMPS, acrylamide and itaconic acid. The polymer is used as a fluid loss agent in oil well cementing in conjunction with dispersants, like naphthalene sulfonate formaldehyde condensate alkali salt, a polymer of ketone aldehyde sulfonate alkali salt, or lignosulfonate. At the same time, all of the above can be used in freshwater to saturated NaCl or seawater cement slurries where HEC fluid loss additive does not work.

12 Claims, No Drawings

FLUID LOSS AGENTS FOR OIL WELL CEMENTING COMPOSITION

BACKGROUND OF THE INVENTION 1. Field of the Invention

The present invention relates to an aqueous cementing composition and method of using same in cementing oil and gas wells and the like. More particularly, the present invention concerns incorporation of at least water dispersible terpolymers or salts thereof prepared in part from a monomer which is an unsaturated polybasic acid as a fluid loss control additive in a hydraulic cement used in drilling wells in subterranean formations. 2. Description of Art Oil well cementing and other underground cementing operations often require placement of a slurry of cement, water and other additives in a porous environment such as porous earthen or rock strata. For example, cement compositions are used in the oil and gas industry to cement the annular space in the well bore between the surrounding formation and pipe or casing. Typically, the cement slurry is pumped down the inside of the casing and back up the outside of the casing through the annular space. The slurry is allowed to set up or harden in the annular space, thereby forming a rigid column which ideally forms a bond with the earth formation as well as with the metal pipe. To achieve a satisfactory primary cementing job, it is important to achieve a tight bond to prevent vertical communication of fluids or gas along or within the column, which could contaminate the producing zone, or permit a loss of reserves.

The primary functions of the cementing process are to restrict fluid movement between geological formations and to bond and support the casing. In addition the cement aids in protecting the casting from corrosion, preventing blowouts by quickly sealing formations, protecting the casing from shock loads in drilling deeper wells, and sealing off lost circulation or thief zones.

A common problem in petroleum well cementing is the flow of liquid from the cement slurry into porous earth formations in contact with the cement. This fluid loss is undesirable since it can result in dehydration of the cement slurry, and it causes thick filter cakes of cement solids which can plug the well bore. The fluid lost can damage sensitive formations. Cement fluid loss is particularly a problem in the process known as squeeze cementing.

Problems develop when water filters out of the slurry, i.e., the filtrate, into the porous media during the setting period. As a result of the rapid water loss, the cement acquires impaired qualities of strength and an uncontrollable setting rate. Also, the water loss from the cement frequently damages the surrounding strata formation. The problem is not cured by producing a cement slurry containing more water. This results in serious placing and setting problems.

Adequate fluid loss control is also important in achieving effective primary cementing. Inadequate fluid loss control can result in the formation of a bridge in the annulus opposite a permeable zone, thus isolating a lower zone from the hydrostatic pressure above the bridge. Only a small amount of filtrate loss beneath such a bridge is then necessary to drop the annular pressure to beneath that of the formation pressure. The result is an influx of formation fluids and pressure, creating flow channels and the need for expensive remedial work.

In attempting to control fluid loss from the cementing slurry to the surrounding formation, it is important to reduce the cement matrix permeability and retain water during the initial set, effectively blocking the porous cement structure. One way to do this is to reduce filtrate mobility by increasing the filtrate viscosity to counter the normal thermal thinning of the cement slurry which occurs at down hole temperatures. An increase in filtrate viscosity at down hole temperatures minimizes thermal thinning and increases the retention of the filtrate within the cement matrix. Conventional fluid loss polymers do not effectively counteract thermal thinning with increased temperature thereby allowing fluid loss to the formation and promoting stratification of solids within the cement column.

This is a requirement, therefore, for materials which, when added to the cement formulation, reduce the loss of fluid from the slurry to porous formations.

Certain polymer compositions have long been recognized by those skilled in the art of cementing wells in the petroleum industry as cementing additives useful in reducing fluid loss from a slurry of cement and water to the surrounding environment, i.e., the formation. These compositions are commonly referred to as "fluid loss additives." Such additives will be used in well cementing operations where the bottom hole circulating temperatures (BHCT) may range from 80° to 170° F., substantial salt concentrations may be present, and slurry retardation and viscosity are critical aspects as same affect pumpability and compressive strength. Exemplary prior art fluid loss additives are described in U.S. Pat. Nos. 3,140,269; 3,234,154; 3,483,007; 3,491,049; 3,662,830 and 4,258,790.

One type of fluid loss additive used in cementing compositions consists of cellulose-base controlling agents, such as methyl cellulose, carboxymethylcellulose (CMC) and hydroxyethylcellulose (HEC) which may be employed with or without a dispersant such as condensed napthalenesulfonic acid salts. However, there are several disadvantages to the use of CMC or HEC as cement fluid loss control additives. They are solid and as a result are difficult to handle in offshore operations. In addition, they tend to considerably increase the slurry viscosity, retard the cement, thereby preventing its movement under turbulent flow conditions. Also, they lose effectiveness in the presence of soluble calcium salts and at elevated temperatures.

Another type of fluid loss control additive exhibiting desirable qualities has been polymers such as polyamines and polyethyleneimines. U.S. Pat. No. 3,491,049 to Gibson et al. discloses an aqueous hydraulic cement slurry including hydraulic cement, water, a surfactant, and a small amount of polyalkylenepolyamine, polyalkenimine or a mixture thereof. The Gibson et al. patent teaches the use of a sulfonated naphthalene condensate dispersant as an additional additive to the cement slurry which cooperates with the polyamine additive to provide satisfactory fluid loss in cement slurries used at about 200° F. and below. The sulfonated naphthalene dispersant is typically a low molecular weight material, e.g., in the range from about 1,000 to 3,000. McKenzie et al. discuss use of liquid polyamines with lignosulfonate in their article entitled "Polyamine Compounds Control Cement Fluid Loss in Freshwater of Seawater Slurries", *Oil & Gas Journal*, 80(13) Mar. 29, 1982, pp. 146–148.

Use of polyamines as an additive has some serious drawbacks however. The polyamines are available only as liquids, usually as 30–50 percent active solutions of the polymers in water, and give very thin slurries. Consequently, they can be added to the hydraulic cement only at the time of formation of the cement slurry. This must be done at the well site immediately prior to pumping the slurry into the well. Under these circumstances, the liquid polyamines must be available at the well and measured for mixing with the cement under non-ideal conditions. Their main disadvantage is that they tend to be incompatible with most of the additives for cement, such as dispersants and retarders, due to their cationic nature.

The liquid polyamines also require addition of sulfonated polymers to the cement composition to provide effective fluid loss control. It has been known that sulfonated polymers form a slimy pultaceous precipitate with the polyamines. This is disclosed in U.S. Pat. No. 2,839,417 to Tousignant et al. This precipitate is the effective fluid loss control agent. The sulfonated polymers have the characteristic of acting as retardants. This characteristic is undesirable at temperatures below 100° F.

Another cement additive employed for control of fluid loss is a copolymer of acrylamide and acrylic acid [L. F. McKenzie, F. M. McElflesh, SPE 1-623,279 (1982)]. Although this material performs well at high temperature and in the presence of soluble calcium salts, it has the undesirable property of strongly retarding cement. This retarding effect increases with increasing temperature, most likely due to the hydrolysis of the unstable amide groups contained in the polymer which accelerates at elevated temperature. Hydrolysis of amide functions produces additional carboxylic acid residues which are credited with cement retarding activity.

Mixtures of HEC, polyvinyl pyrrolidone and sodium naphthalene sulfonate are described as cement fluid loss additives in U.S. Pat. Nos. 3,132,693 and (3,359,225) describes mixtures of polyvinyl pyrrolidone and sodium naphthalenesulfonate-formaldehyde condensation products as cement fluid loss additives. Also complex mixtures of maleic anhydride-N-vinylpyrrolidone copolymers with polymers of poly (aryl-vinylbenzyl) alkyl and hydroalkyl substituted quaternary ammonium bases and salts are described as cement fluid loss additives in U.S. Pat. No. 3,140,269 to Wahl. An improved fluid loss additive for well cements consists of 30 to 70 weight percent of N-vinyl-pyrrolidone homopolymer, from about 5 to 19 weight percent of carboxymethyl cellulose or hydroxyethylcellulose, and the sodium salt of condensed naphthalenesulfonic acid. [B. W. Hale, U.S. Pat. No. 4,258,780 (Mar. 31, 1982)].

U.S. Pat. No. 3,409,080 to Harrison, issued Nov. 5, 1968, mentions that polyvinyl alcohol and polyvinyl acetate can be used as polymeric fluid loss agents in oil well cements. The particular type of polyvinyl alcohol utilized is not stressed and the example given in the patent uses a polyvinyl alcohol which is 88% hydrolyzed.

It is also applicants' understanding that the polyvinyl alcohol polymers used as fluid loss agents in the past were always soluble in the cement slurry at ambient temperatures.

Another polymer described in U.S. Pat. No. 4,015,991 to Persinski et al. as a useful fluid loss additive for hydraulic oil well cements consists of a hydraulic cement slurry consisting of hydrolyzed copolymers of acrylamide (AM) and 2-acrylamido-2-methyl propane sulfonic acid (AMPS). However, these AM/AMPS copolymers are useful only in operations where the bottom hole circulation temperature (BHCT) ranges from 90° to 125° F., whereas BHCT ranges encountered in such operations are often outside such a range. Still further, these copolymers have a salt tolerance of only up to about 10%.

The temperature limitations of the AM/AMPS copolymers, i.e., loss of usefulness above about 125° F. BHCT, are believed to be the result of hydrolysis of the amide groups. The carboxylate groups formed by such hydrolysis convert the copolymers to materials which function to retard the setting of the cement and to reduce the compressive strength of the set cement. Further, in the lower portion of the above-mentioned temperature range (between 90° and 100° F.) the AM-/AMPS is less effective as a fluid loss additive, requiring inclusion of larger amounts of such additive than at higher temperatures. The inclusion of sufficiently large amounts of additive to create an acceptable fluid loss composition often creates viscosity and pumpability problems, since the addition of such copolymer directly affects the resultant slurry rheology. Copolymers of acrylamide and AMPS exhibit high viscosity and poor mixability, resulting in cement slurries having poor pumpability characteristics during cementing operations. Mixability is a subjective term used to describe how well the components in the cement composition wet and mix with each other, as well as the energy required to create a generally homogeneous slurry.

Hence, the industry desires a fluid loss additive that has as little effect on compressive strength, set time, viscosity and thickening time as possible; is salt tolerable, i.e., does not exhibit substantial loss of effectiveness in the present of salt; and is chemically stable during cementing operations. Further, such desired fluid loss additive should be compatible with as many other additives and environmental conditions as possible, should be water dispersible or soluble in cement slurries at normal ambient temperature encountered in oil well cementing operations, as well as to continue to provide fluid loss characteristics over broad temperature and cement pH range.

U.S. Pat. No. 4,404,111 discloses the use of copolymers of N,N-dimethylacrylamide (NNDMA) and AMPS as viscosity control agents in aqueous compositions to facilitate petroleum recovery from subterranean bearing formations. The method of preparing said copolymers uses conventional free radical initiators such as ammonium persulfate and results in copolymers having average molecular weights of greater than about one million. Further, the amount of NNDMA monomer employed in preparing the AMPS/NNDMA copolymer is disclosed as between 70 and about 99.5 weight percent.

SUMMARY OF THE INVENTION

Cementing compositions for use in oil, gas and water well cementing operations are disclosed. More particularly, such compositions are comprised of water, hydraulic cement and terpolymers and alkali metal, ammonium or organic amine salts of terpolymers of an unsaturated polybasic acid monomer which are at least water dispersible. Such terpolymers and alkali metal, ammonium or organic amine salts thereof have been found to be outstanding fluid loss additives for such hydraulic cementing compositions, especially under conditions of high temperature and pressure.

The terpolymers useful in this invention are comprised of an unsaturated polybasic acid (1-60 weight percent), a nonionic monomer (10 to 76 weight percent) and a vinyl containing alkyl or aromatic substituted sulfonate selected from AMPS, sodium vinyl sulfonate and vinyl benzene sulfonate (10 to 75 weight percent). The terpolymers and alkali metal, ammonium or organic amine salts thereof used in the present invention are relatively stable to hydrolysis over a wide range of temperature and pH. They may be admixed in solid form with any dry hydraulic oil field cement or may be added at the time the cement slurry is being prepared, either to the mixing water or to the slurry in a liquid form.

Additionally, methods of cementing a conduit in a borehole penetrating an earthen formation by introducing such a cementing composition into the space between such conduit and formation are disclosed.

So that the above-recited features, advantages and objects of the invention, as well as others which will become apparent, are attained and can be understood in detail, more particular description of the invention is set forth below with respect to typical embodiments thereof, but the described embodiments should not be considered limiting of its scope, for the invention may admit to other equally effective embodiments which will be apparent from the description to one of ordinary skill in the art.

DETAILED DESCRIPTION OF THE INVENTION

New cementing compositions and methods of using the same in oil, gas and water well cementing operations are disclosed. Such compositions are comprised of water, hydraulic cement, and a fluid loss reducing additive comprised of a particular terpolymer or metal salt thereof.

The terpolymer used in the cementing compositions of this invention includes (1) an unsaturated polybasic acid monomer and alkali metal, ammonium or organic amine salts thereof; (2) a nonionic monomer selected from the group consisting of acrylamide, N,N-dimethyl acrylamido, N-vinyl pyrrolidone, N-vinyl acetamide, dimethylamino ethyl methacrylate and (3) an acid selected from the group consisting of AMPS, sodium vinyl sulfonate and vinyl benzene sulfonate and metal salts thereof.

Suitable unsaturated polybasic acids include unsaturated dicarboxylic acids and tricarboxylic acids such as maleic acid (MA), fumaric acid (FA), citraconic acid (methyl maleic acid), mesaconic acid (methyl fumaric acid), itaconic acid (IA), glutaconic acid, 1-butene 2,3,4-tricarboxylic acid, aconitic acid (1,2,3-propenetricarboxylic acid), dimethylmuconic acid and the like.

In its terpolymer form, the range of the three components is from about 1 to about 60 weight percent unsaturated polybasic acid, from about 10 to 76 weight percent nonionic monomer, and from about 10 to 75 weight percent vinyl containing alkyl or aromatic substituted sulfonate. Further, when such cementing compositions contain an alkali metal, ammonium or organic amine salt in an amount up to about 18% by weight of water, then the preferred ratio of monomers is 25:70:5. The polymers have a weight average molecular weight of between about 200,000 and about 1,000,000, preferably between about 300,000 to about 700,000.

The terpolymers can be used in their free acid form or in the form of any partially or completely neutralized inorganic, organic amine or quaternary ammonium salt so long as they are at least water dispersible, i.e., water dispersible or water soluble. Examples are the sodium, potassium, ammonium, mono-, di- and tri-, $C_1$-$C_4$ alkyl amine and mono-, di- and tri-, $C_2$-$C_4$ alkanolamine salts. They also can contain mixed sodium, potassium, ammonium, organic amine or quaternary ammonium cations in their partially or completely neutralized form. Also, the cation in the terpolymer may be dependent upon the pH of the cementing composition. For example, if the terpolymer is introduced into the cementing composition in its free acid form, as a result of the alkalinity of the cement, it may actually be present in the cementing composition in the form of its partially or completely neutralized salt form.

The terpolymers of this invention can be prepared from their respective monomers by conventional polymerization procedures, viz., solution, emulsion or bulk polymerization in the presence of conventional free radical initiators. Such procedures are well documented in the literature and do not form a part of this invention.

Solution polymerization is more rapidly controlled than bulk or emulsion polymerizations. It has been found that when solution polymerized terpolymers of this invention are employed in the cementing compositions of this invention, better rheology and fluid loss properties are obtained, in general, than with bulk or emulsion polymerized terpolymers of this invention.

Examples of terpolymers are (percents are weight percents):

sodium salt of the terpolymer of acrylamide (30%), AMPS (64%) and itaconic acid (6%);

sodium salt of the terpolymer of acrylamide (39%), AMPS (54%) and maleic acid (7%);

sodium salt of the terpolymer of acrylamide (40%), AMPS (55%) and glutaconic acid (5%);

sodium salt of the terpolymer of acrylamide (30%), AMPS (64%) and, α, α'- dimethylmuconic acid;

potassium salt of the terpolymer of acrylamido (54%), AMPS (39%) and itaconic acid (7%);

potassium salt of the terpolymer of N,N-dimethylacrylamide (30%), vinyl sulfonate (64%) and itaconic acid (6%);

potassium salt of the terpolymer of acrylamide (39%), AMPS (54%) and fumaric acid (7%);

free acid of the terpolymer of acrylamide (70%), AMPS (23%) and itaconic acid (7%);

free acid of the terpolymer of acrylamide (76%), AMPS (19%) and aconitic acid (5%);

free acid of the terpolymer of acrylamide (25%), AMPS (70%) and itaconic acid (5%);

diethanolamine salt of the terpolymer of N-vinyl acetamide (39%), AMPS (54%) and itaconic acid (7%);

diethanolamine salt of the terpolymer of N-vinyl pyrrolidone (40%), AMPS (55%) and citraconic acid (5%);

diethanolamine salt of the terpolymer of dimethylamino ethyl methacrylate (54%), AMPS (39%) and itaconic acid (7%);

trimethyl ammonium salt of the terpolymer of acrylamide (25%), AMPS (70%) and 1-butene 2,3,4-tricarboxylic acid (5%);

trimethyl ammonium salt of the terpolymer of acrylamide (70%), vinyl sulfonate (23%) and itaconic acid (7%);

trimethyl ammonium salt of the terpolymer of acrylamide (76%), AMPS (19%) and mesaconic acid (5%);

triethanolamine salt of the terpolymer of acrylamide (30%), AMPS (64%) and itaconic acid (6%);

triethanolamine salt of the terpolymer of N,N-dimethylacrylamide (40%), AMPS (55%) and itaconic acid (5%);

triethanolamine salt of the terpolymer of N,N-dimethylacrylamide (25%), vinyl benzene sulfonate (70%) and itaconic acid (5%);

monoethanolamine salt of the terpolymer of acrylamide (54%), AMPS (39%) and itaconic acid (7%);

monoethanolamine salt of the terpolymer of N,N-dimethylacrylamide (40%), vinyl benzene sulfonate (55%) and fumaric acid (5%); and monoethanolamine salt of the terpolymer of acrylamide (25%), AMPS (70%) and itaconic acid (5%).

The polymers can be added to the cement composition in dry, solution or emulsion form.

The result of inclusion of such fluid loss additives in cementing compositions is the exhibition of better pumpability characteristics, which generally improves drilling fluid removal while reducing the possibility of lost circulation, when cementing a conduit penetrating a permeable earthen formation via introduction of such composition into the space between such conduit and the formation due to the fluid loss characteristics exhibited by the fluid loss additive.

The cement component of the cement composition of this invention may be any of the API classes of cement and cement blends, as same are defined in the American Petroleum Institute Bulletin entitled "API Specification for Material and Testing for Well Cements" dated January, 1982 ("API Spec. 10"), and incorporated herein by reference. These include those cements defined as Classes "A" through "H" in API Spec. 10.

The cement compositions of this invention may contain at least one inorganic or organic salt. Suitable salts include inorganic monovalent and polyvalent metal salts, such as magnesium chloride, ammonium chloride, potassium chloride, sodium chloride and calcium chloride.

The cement compositions of this invention also may contain a dispersant to improve flowability and assist the water in wetting the cement particles. By "dispersant" is meant any anionic surfactant, i.e., any compound which contains a hydrophobic portion (e.g., any hydrocarbon substituent such as alkyl, aryl or alkaryl group) and a hydrophilic portion (e.g., any negatively charged moiety, such as $O^{31}$, $CO_2^-$, or $SO_3^-$). Suitable dispersants include sulfonic acid derivatives of aromatic or aliphatic hydrocarbons, such as naphthalene sulfonic acid formaldehyde condensation product derivatives, particularly their sodium or potassium salts. Examples of dispersant that may be used include lignosulfonates; sodium and potassium naphthalene sulfonate formaldehyde condensation products (such as Lomar D commercially available from Diamond Shamrock Chemicals Company, Morristown, N.J. 07960); and sodium salts of ketone sulfonate formadehyde.

Other additives conventionally added to cement compositions useful in cementing casings in the borehole of a well also can be added to the cement composition of this invention in the amounts normally used. These additives may include, for example, (1) heavy weight additives, such as hematite, ilmenite, silica flour and sand; (2) cement retarders such as lignins and lignosulfonates; and (3) additives for controlling lost circulation; such as walnut hulls and cellophane flakes.

The fluid loss additives of this invention will cause substantial reductions in the rate of water loss by filtration and in the apparent viscosity of cement slurries. They are easily mixable and result in good fluid loss control while still exhibiting good flow properties at 0.05% to 2% by weight addition to the cement, depending upon the type of cement. Under API standards, excellent fluid loss control (50 to 100 cc/30 min) may be achieved by the addition of about 0.05% to about 0.35% by weight of the cement of such fluid loss additive to a normal dense cement. Slurry control in filler type cementing compositions with high water requirements (such as Class H cement with 8% bentonite by weight of cement and 9.07 gal water/sck) is generally more modest and may require increased addition of such additives. Typically, a fluid loss of between 20 and 100 cc/30 min. can be obtained with a 0.25% to 0.50% by weight addition of the additive of the present invention.

Fluid loss properties can be controlled in salt cement formulations (such as up to saturated NaCl and seawater) with the addition of 0.25% to 1% by weight of the additives of the present invention, without adversely affecting cement rheology.

Hence, a desired range of amount of the fluid loss additive of this invention to be added is about 0.15% to 0.75% by weight of cement, preferably about 0.25% to 0.50% by weight of cement.

The polymeric additives of the present invention exhibit minimal retardation effects on the cement slurry. Such characteristics will cause only a small to moderate increase in thickening time depending on temperature and slurry composition. Also the fluid loss additives do not substantially thicken the cement slurry which permits the use of increased amounts of fluid loss additives without significant thickening of the cement slurry. Thus, the fluid loss additives of this invention have minimal detriment to cement rheology.

In order to facilitate a better understanding of the present invention, the following examples are given.

EXAMPLE I: Preparation of a Terpolymer of AMD, AMPS and IA Having A Weight Ratio Of 40:55:5

Into a 1 liter resin flask fitted with a stirrer, condensor, thermometer, nitrogen inlet and port for adding liquid is placed 425 g of deionized water, 200 g of a 50% solution of acrylamide, 276 g of a 50% solution of AMPS, 30 g of a 40% solution of disodium itaconate and 0.24 g of Versene 100. The solution is stirred and to it added 0.2 g of sodium hypophosphite dissolved in 16 g of deionized water. The solution is stirred, nitrogen introduced sub-surface and the solution then heated to 75° C. by means of an external heating jacket. A solution of 2.5g of sodium persulfate in 50 g of deionized water is prepared and placed in a metering pump connected to the resin flask at the inlet port with a fine tygon tubing. The persulfate solution is added uniformly over a period of 2 hours, maintaining a temperature of 75° C. ±2° C. by initially cooling and then warming. At the end of the persulfate addition, 75° C. is maintained for an additional 1 hour, the solution cooled to 40° C. and discharged. The resulting product was a clear, light green-yellow liquid with a solids content of 25%. The viscosity, as measured on a Brookfield viscometer was 7,500 cps, spindle 3, speed 12. The pH of the solution was 7 to 7.6. The molecular weight of the polymer was about 500,000 as measured by GPC. The product was completely water miscible.

EXAMPLES IIA-IID: Preparation of Terpolymers

The procedure described in Example I was repeated to prepare the following terpolymers useful as fluid additives for cement composition in this invention:
(A) AMD, AMPS and IA in a weight ratio of 76/19/5
(B) AMD, AMPS and IA in a weight ratio of 25/70/5
(C) AMD, AMPS and MA in a weight ratio of 40:55:5
(D) AMD, AMPS and FA in a weight ratio of 40:55:5

In the above examples, the sodium salt of the IA, MA and FA was used in the product preparation.

EXAMPLE III: Performance Testing of Terpolymers of Examples I and IIA-IID as Fluid Loss Additives in Cement Formulations The terpolymer of Examples I and IIA-IID were dried and then tested as fluid loss additives in the following cement formulations A to D:

| | | |
|---|---|---|
| A. Cement H | 860 grams | |
| Water | 327 grams | |
| Dispersant (sodium naphthalene sulfonate formaldehyde condensate | 1% by weight of cement | |
| Terpolymer of Example I | 0.25% by weight of cement | |
| Defoamer (VCX, commercially available from Diamond Shamrock Chemicals Company) | 0.2% by weight of cement | |
| B. Cement Class H | 500 grams | |
| Water | 230 grams | |
| Sodium Chloride | 41.4 grams | |
| Dispersant (sodium naphthalene sulfonate formaldehyde condensate | 1.25% by weight of cement | |
| Terpolymer of Example I | 0.5% by weight of cement | |
| Defoamer (VCX) | 0.2% by weight of cement | |
| C. Cement Class H | 600 grams | |
| Water | 271 grams | |
| Sea salt | 11.4 grams | |
| Dispersant (sodium naphthalene sulfonate formaldehyde condensate) | 1.5% by weight of cement | |
| Terpolymer of Example I | 0.5% by weight of cement | |
| Defoamer (VCX) | 0.2% by weight | |
| D. Cement Class H | 500 grams | |
| Water | 230 grams | |
| Sodium Chloride | 41.4 grams | |
| Dispersant (sodium naphthalene sulfonate formaldehyde condensate) | 1.25% by weight of cement | |
| Terpolymer of Examples I, IIA, IIB, IIC or IID | 0.5% by weight of cement | |
| Defoamer (VCX) | 0.2% by weight | |

Tables I and II summarize results obtained from a variety of tests conducted using fluid loss additives in cement compositions according to this invention and using other fluid loss additives for comparison purposes. HEC, a fluid loss additive employed commercially in cement compositions was used as the standard for comparison purposes. Fluid loss results comparable to or lower than that obtained with HEC were obtained using the fluid loss additives of this invention. This demonstrates the utility of this invention. The test results set forth in Tables I and II reflect a variety of tests conducted using a class H cement and give a fairly comprehensive view of how the fluid loss additives of this invention perform in various cementing compositions. The results indicate that the fluid loss additives of this invention which are effective in Class H cement, are salt compatible (up to at least 18%) and are effective in reducing rheologies so that turbulent flow with fluid loss control is a viable option. These tests were conducted in accordance with API Spec. 10.

More specifically, the following procedure was employed for the tests whose results are summarized in Tables I and II below:

The testing procedure set forth in API spec. 10 was employed for each cement formulation set forth in the Tables I-II below at the following conditions: consistomer at 140° F., fluid loss at 140° F. and 1000 psi. The following test data was recorded: Fann 35 readings at 600, 300, 200, 100, 6 and 3 RPM. From the Fann 35 readings, plastic viscosity (PV), yield point (YP), n and K values and critical velocity (Vc) were calculated. Fluid loss measurements were taken at 1, 3, 7.5 and 30 minutes, then doubled and recorded. A fluid loss at 30 minutes was calculated based upon the 7.5 minute reading. An explanation of the procedure used to calculate the PV, YP, n, K and Vc values is provided below:

Procedure

The Fann viscometer (Model 35-A) Meter is a direct reading viscometer, having an outer cylinder which can be rotated at 600, 300, 200, 100, 6 and 3 revolutions per minute (rpm). An inner, concentic cylinder is connected to a scale to permit the operator to read same. The reading at 600 rpm and 300 rpm are recorded. From these readings, plastic viscosity and yield point can be calculated.

The plastic viscosity, PV, is a measure of the internal resistance to fluid flow attributable to the amount, type, and size of solids present in a given fluid. The value, expressed in centipoises, is proportional to the slope of the consistency curve determined in the region of laminar flow for materials obeying Bingham's Law of Plastic Flow. When using the direct indicating viscometer, the plastic viscosity is found by subtracting the 300 rpm reading corresponding to a shear rate of 511 sec$^{-1}$ from the 600 rpm reading corresponding to a shear rate of 1021 sec$^{-1}$.

The yield point, YP, also known as the yield value is the resistance to initial flow, or represents the stress required to start fluid movement. This resistance is believed to be due to electrical charges located on or near the surfaces of the particles. Values of yield point and thixotropy, respectively, are measurements of the same fluid properties under dynamic and static states. Bingham yield values reported in lb./100 sq. ft., are determined by using the direct-indicating viscometer and subtracting the plastic viscosity from the 300 rpm reading. Yield point is a parameter of particular interest to this invention.

The terms K and n are used in rheological Power Law Models. These terms are calculated from 600 RPM and 300 RPM Dial Readings taken with the direct indicating viscometer using the following formulas:

$$n = \frac{3.32 \times \log_{10} 600 \text{ RPM Dial Reading}}{300 \text{ RPM Dial Reading}}$$

$$K = \frac{(300 \text{ RPM Reading}) \times 1.066}{100 \times (511)^n}$$

The constant K is the value of the shear stress at a shear rate of 1 sec$^{-1}$. It is measured by extrapolating the straight line of the log of the shear stress versus the log of the shear rate between 10 and 100 sec$^{-1}$ back to a value of sec$^{-1}$. The exponent n is determined by measuring the slope of the curve when plotting the log of the shear stress versus the log of the shear rate between 10 and 100 sec$^{-1}$. The constant K is the consistency index, expressed in lb-sec$^n$/sq. ft. while n is a dimensionless flow behavior index.

The critical velocity, (Vc) is calculated in ft/min from the previous terms n and K using the formula:

$$Vc = \left[ \frac{(1613)(K)(96/d)^n}{\rho} \right]^{\frac{1}{2-n}} \times 60$$

wherein d is the diameter of the pipe in inches and is the density of the cement slurry (16.4).

Tables I and II below sets forth fluid loss additives employed in cement formulations, the cement formulations tested, Fann 35 readings, calculated rheological properties (PV, YP, n, K and Vc) and fluid loss measurements.

With respect to the Tables I and II below, the following abbreviations were used:

HEC—hydroxy ethyl cellulose
AMD—acrylamide
AMPS—2-acrylamido, 2-methyl propane sulfonic acid
IA—itaconic acid
DMAD—N,N-dimethyl acrylamide
NVP—N-vinyl pyrrolidone
AA—acrylic acid
MA—maleic acid
FA—fumaric acid As can be seen from the results set forth in Table I, with cement formulations A, B and, the terpolymer of Example I gave excellent fluid loss properties with no detrimental rheological effects. In contrast, the cement formulations of A, B, C which contained no fluid loss additive or the prior art fluid loss additive HEC had either no fluid loss control or a high viscosity.

As can be seen from the results set forth in Table II, with cement formulation D, Examples I, and IIA, and IIB, IIC, IID gave excellent fluid loss properties with no detrimental rheological effects. In contrast, the cement formulations D which contained prior art fluid loss additives such as HEC, Hostadrill V-2825, AMPS, AMPS and IA, AMD and NVP, AMD and AMPS and AA, and AMD and AMPS had either no fluid loss control or a high viscosity.

TABLE I

| Fluid loss additive | Cement Formulation | FANN 35 READING @ RPM | | | | | | BINGHAM PLASTIC | | | | | CRIT. FLUID LOSS @ 140° F. ml/min @ 1000 psi | | | | |
|---|---|---|---|---|---|---|---|---|---|---|---|---|---|---|---|---|---|
| | | 600 | 300 | 200 | 100 | 6 | 3 | PV | YP | N | K | Vc | 1 | 3 | 7.5 | 30 | 30' CALC |
| NONE | A | 57 | 23 | 15 | 8 | 1 | 1 | 34 | −11 | 1.31 | 0.0001 | 251 | 30 | 64 | 96 | 120 | 192 |
| 0.25% HEC | A | 248 | 149 | 109 | 65 | 11 | 9 | 99 | 50 | 0.73 | 0.0163 | 1225 | 18 | 22 | 44 | 84 | 88 |
| 0.25%. Example I Terpolymer | A | 115 | 61 | 41 | 21 | 2 | 2 | 54 | 7 | 0.91 | 0.0022 | 672 | 18 | 24 | 36 | 70 | 72 |
| NONE | B | 49 | 28 | 21 | 13 | 8 | 8 | 21 | 7 | 0.81 | 0.0019 | 327 | 120 | 120 | 120 | 120 | 657 |
| 0.50% HFC | B | 179 | 127 | 95 | 59 | 12 | 9 | 52 | 75 | 0.49 | 0.0618 | 889 | 120 | 120 | 120 | 120 | 657 |
| 0.50% Example I Terpolymer | B | 88 | 47 | 33 | 18 | 2 | 1 | 41 | 6 | 0.90 | 0.0018 | 526 | 14 | 26 | 40 | 84 | 80 |
| NONE | C | 94 | 76 | 67 | 58 | 17 | 10 | 18 | 58 | 0.31 | 0.1198 | 586 | 120 | 120 | 120 | 120 | 657 |
| 0.50% HEC | C | 247 | 160 | 126 | 84 | 33 | 32 | 87 | 73 | 0.63 | 0.0344 | 1160 | 62 | 98 | 120 | 120 | 310 |
| 0.50% Example I Terpolymer | C | 119 | 72 | 53 | 31 | 7 | 6 | 47 | 25 | 0.72 | 0.0084 | 685 | 28 | 70 | 120 | 120 | 221 |

TABLE II

| Fluid Loss Additive for Cement Formulation D | Monomer Weight % | FANN 35 READING @ RPM | | | | | | BINGHAM PLASTIC | | | | |
|---|---|---|---|---|---|---|---|---|---|---|---|---|
| | | 600 | 300 | 200 | 100 | 6 | 3 | PV | YP | N | K | Vc |
| +0.50% HOSTADRILL V-2825 | 100 | 138 | 91 | 73 | 52 | 32 | 29 | 47 | 44 | 0.60 | 0.0229 | 757 |
| +0.50% AMPS | 100 | 340 | 252 | 194 | 133 | 49 | 43 | 88 | 164 | 0.43 | 0.1818 | 1321 |
| +0.50% AMPS/IA | 95/5 | 143 | 102 | 83 | 59 | 29 | 23 | 41 | 61 | 0.49 | 0.0521 | 765 |
| +0.50% AMD/NVP | 70/30 | 97 | 58 | 47 | 34 | 16 | 11 | 39 | 19 | 0.74 | 0.0061 | 583 |
| +0.50% AMD/AMPS/DMAD | 13/77/10 | 300 | 300 | 300 | 300 | 300 | 300 | * | * | ** | ** | ** |
| +0.50% AMD/AMPS/AA | 30/65/5 | 128 | 85 | 69 | 51 | 44 | 35 | 43 | 42 | 0.59 | 0.0228 | 717 |
| +0.50% AMD/AMPS/AA | 30/50/20 | 219 | 143 | 107 | 78 | 37 | 37 | 76 | 67 | 0.61 | 0.0330 | 1058 |
| +0.50% EXAMPLE IIA | 76/19/5 | 131 | 81 | 62 | 39 | 7 | 5 | 50 | 31 | 0.69 | 0.0115 | 736 |
| +0.50% EXAMPLE I | 40/55/5 | 120 | 74 | 56 | 36 | 8 | 6 | 46 | 28 | 0.70 | 0.0102 | 689 |
| +0.50% EXAMPLE IIB | 25/70/5 | 141 | 84 | 63 | 38 | 6 | 4 | 57 | 27 | 0.75 | 0.0085 | 786 |
| +0.50% AMD/AMPS/AA | 10/50/40 | 300 | 300 | 300 | 300 | 300 | 300 | * | * | ** | ** | ** |
| +0.50% AMD/AMPS | 50/50 | 120 | 71 | 52 | 33 | 15 | 15 | 59 | 22 | 0.76 | 0.0068 | 691 |
| +0.50% EXAMPLE IIC | 40/55/5 | 73 | 39 | 27 | 15 | 2 | 2 | 34 | 5 | 0.90 | 0.0015 | 444 |
| +0.50% EXAMPLE IID | 40/55/5 | 84 | 44 | 31 | 16 | 2 | 1 | 40 | 4 | 0.93 | 0.0014 | 501 |
| +0.50% HEC | 100 | 181 | 150 | 109 | 69 | 16 | 11 | 31 | 119 | 0.27 | 0.0295 | 858 |

| Fluid Loss Additive for Cement Formulation D | Monomer Weight % | CRIT. FLUID LOSS @ 140° F. ml/min @1000 psi | | | | |
|---|---|---|---|---|---|---|
| | | 1 | 3 | 7.5 | 30 | 30' CALC |
| +0.50% HOSTADRILL V-2825 | 100 | 22 | 82 | 120 | 120 | 259 |
| +0.50% AMPS | 100 | 36 | 66 | 120 | 120 | 209 |
| +0.50% AMPS/IA | 95/5 | 120 | 120 | 120 | 120 | 657 |
| +0.50% AMD/NVP | 70/30 | 120 | 120 | 120 | 120 | 657 |
| +0.50% AMD/AMPS/DMAD | 13/77/10 | | | SOLID | | |
| +0.50% AMD/AMPS/AA | 30/65/5 | 66 | 120 | 120 | 120 | 361 |

TABLE II-continued

| | | | | | | |
|---|---|---|---|---|---|---|
| +0.50% AMD/AMPS/AA | 30/50/20 | 64 | 90 | 120 | 120 | 351 |
| +0.50% EXAMPLE IIA | 76/19/5 | 16 | 26 | 40 | 84 | 80 |
| +0.50% EXAMPLE I | 40/55/5 | 14 | 26 | 60 | 78 | 120 |
| +0.50% EXAMPLE IIB | 25/70/5 | 12 | 18 | 28 | 54 | 56 |
| +0.50% AMD/AMPS/AA | 10/50/40 | | | SOLID | | |
| +0.50% AMD/AMPS | 50/50 | 38 | 74 | 120 | 120 | 208 |
| +0.50% EXAMPLE IIC | 40/55/5 | 76 | 98 | 120 | 120 | 416 |
| +0.50% EXAMPLE IID | 40/55/5 | 80 | 100 | 120 | 120 | 438 |
| +0.50% HEC | 100 | 120 | 120 | 120 | 120 | 657 |

*Too thick to measure
**Cannot be calculated

What is claimed is:

1. A cementing composition useful in cementing oil, gas and water wells comprising:
   water;
   hydraulic cement; and
   a water dispersible fluid loss additive comprised of a terpolymer of (1) from about 10 to about 75 weight percent of a vinyl containing alkyl or aromatic substituted sulfonate selected from the group consisting of 2-acrylamido-2 methylpropane sulfonic acid, sodium vinyl sulfonate and vinyl benzene sulfonate; (2) from about 10 to 76 weight percent of a nonionic monomer selected from the group consisting of acrylamide, N,N-dimethylacrylamide, N-vinyl pyrrolidone, N-vinyl acetamide and dimethylamino ethyl methacrylate; and (3) from about 1 to 60 weight percent of an unsaturated polybasic acid selected from the group consisting of itaconic acid, maleic acid, fumaric acid, citraconic acid, mesaconic acid, glutaconic acid, aconitic acid, α, α'- dimethylmuconic acid and 1-butene 2,3,4-tricarboxylic acid, said polymer having a weight average molecular weight of between about 200,000 and about 1,000,000, being in its free acid or partially or completely neutralized form, and being at least water dispersible.

2. The composition of claim 1 wherein said fluid loss additive is present in an amount in the range of from about 0.05% to about 2% by weight of the cement.

3. The composition of claim 2 in which said terpolymer is in the form of at least one free acid or partial or complete sodium, potassium, ammonium, organic amine or quaternary ammonium salt, said salt containing one or more of sodium, potassium, ammonium, organic amine or quaternary ammonium cations.

4. The composition of claim 3 wherein said terpolymer contains from about 19 to about 70 weight percent of said vinyl containing alkyl or aromatic substituted sulfonate, from about 25 to about 76 weight percent of said nonionic monomer, and from about 1 to about 20% of said unsaturated polybasic acid.

5. The composition of claim 3 in which said terpolymer comprises about 64 weight percent 2-acrylamido-2-methylpropane sulfonic acid, about 30 weight percent acrylamide and about 6 weight percent itaconic acid.

6. The composition of claim 3 in which said terpolymer comprises about 54 weight percent 2-acrylamido-2-methylpropane sulfonic acid, about 39 weight percent acrylamide and about 7 weight percent itaconic acid.

7. The composition of claim 3 in which said terpolymer comprises about 55 weight percent 2-acrylamido-2-methylpropane sulfonic acid, about 40 weight percent acrylamide and about 5 weight percent itaconic acid.

8. The composition of claim 3 in which said terpolymer comprises about 39 weight percent AMPS, about 54 weight percent acrylamide and about 7 weight percent itaconic acid.

9. The composition of claim 3 in which said terpolymer comprises about 70 weight percent AMPS, about 25 weight percent acrylamide and about 5 weight percent itaconic acid.

10. The composition of claim 3 in which said terpolymer comprises about 19 weight percent AMPS, about 76 weight percent acrylamide and about 7 weight percent itaconic acid.

11. The composition of claim 3 in which said terpolymer comprises about 23 weight percent 2-acrylamido-2-methylpropane sulfonic acid, about 70 weight percent acrylamide and about 7 weight percent itaconic acid.

12. A method of cementing a conduit in a borehole penetrating an earthen formation by introducing a cementing composition into the space between said conduit and said formation, wherein said cementing composition comprises:
    water;
    hydraulic cement; and
    a water dispersible fluid loss additive comprised of a terpolymer of (1) from about 10 to about 75 weight percent of an acid selected from the group consisting of 2-acrylamido-2 methylpropane sulfonic acid, sodium vinyl sulfonate and vinyl benzene sulfonate; (2) from about 10 to 76 weight percent of a nonionic monomer selected from the group consisting of acrylamide, N,N-dimethylacrylamide, N-vinyl pyrrolidone, N-vinyl acetamide and dimethylamino ethyl methacrylate; and (3) from about 1 to 60 weight percent of an unsaturated polybasic acid selected from the group consisting of itaconic acid, maleic acid, fumaric acid, citraconic acid, mesaconic acid, glutaconic acid, aconitic acid, dimethylmuconic acid and 1-butene 2,3,4-tricarboxylic acid, said polymer having an average molecular weight of between about 200,000 and about 1,000,000 being in its free acid or partially or completely neutralized form and being at least water dispersible.

* * * * *